(12) United States Patent
Mori

(10) Patent No.: US 7,685,926 B2
(45) Date of Patent: Mar. 30, 2010

(54) NEGATIVE PRESSURE BOOSTER

(75) Inventor: Yasushi Mori, Higashimatsuyama (JP)

(73) Assignee: Bosch Corporation, Tokyo (JP)

( * ) Notice: Subject to any disclaimer, the term of this patent is extended or adjusted under 35 U.S.C. 154(b) by 1205 days.

(21) Appl. No.: 10/553,039

(22) PCT Filed: Apr. 28, 2004

(86) PCT No.: PCT/JP2004/006163

§ 371 (c)(1),
(2), (4) Date: Oct. 11, 2005

(87) PCT Pub. No.: WO2004/101340

PCT Pub. Date: Nov. 25, 2004

(65) Prior Publication Data

US 2006/0207420 A1    Sep. 21, 2006

(30) Foreign Application Priority Data

May 16, 2003   (JP)  ............................. 2003-138229

(51) Int. Cl.
*F15B 9/10* (2006.01)
(52) U.S. Cl. .................................................. 91/376 R
(58) Field of Classification Search ................ 91/369.1, 91/376 R
See application file for complete search history.

(56) References Cited

U.S. PATENT DOCUMENTS 7,201,456 B2 * 4/2007 Bacardit et al. ........... 91/376 R
7,334,512 B2 * 2/2008 Hashida ..................... 91/376 R
7,472,968 B2 * 1/2009 Tsubouchi et al. ........ 91/376 R

FOREIGN PATENT DOCUMENTS

| EP | 1 295 770 A2 | 9/2002 |
| JP | 10-59165 A | 3/1998 |
| JP | 11-334573 A | 12/1999 |
| JP | 2001-63550 A | 3/2001 |
| JP | 2003-191834 A | 7/2003 |

* cited by examiner

*Primary Examiner*—Michael Leslie
(74) *Attorney, Agent, or Firm*—Manabu Kanesaka (57) ABSTRACT

In a negative pressure booster (1) of the present invention, at the time of performing a usual braking operation in a low deceleration region, a force attributed to the pressure difference between pressures applied to a variable pressure chamber and a constant pressure chamber is equal to or smaller than a sum of a set spring load of a spring (31) and a spring load of a valve spring (18). Accordingly, a vacuum valve seat member (27) is not moved and the usual braking operation is performed at a small servo ratio. Further, during the usual braking operation in an intermediate deceleration region, the force attributed to the pressure difference is larger than the sum of the above-mentioned spring loads and hence, the vacuum valve seat member (27) moves rearwardly while pushing a valve element (12). Accordingly, a valve opening quantity of an atmospheric valve (16) is increased while shortening a pedal stroke and hence, a braking operation for intermediate deceleration is performed at a larger servo ratio, whereby brake manipulation feeling can be enhanced.

3 Claims, 6 Drawing Sheets

※ $A_P \fallingdotseq A_V$
AND
$A_L > A_P$

NEGATIVE PRESSURE BOOSTER

BACKGROUND ART

The present invention relates to a technical field of a negative pressure booster which is used in a brake booster or the like, and more particularly to a technical field of a negative pressure booster which is used as a brake booster or the like of a brake system in a vehicle which can obtain a deceleration during the usual braking operation of a vehicle having a large vehicle weight corresponding to a pedal stroke amount.

Conventionally, in a brake system of a vehicle such as an automobile, a negative pressure booster which makes use of negative pressure has been used in a brake booster. In such a conventional generally-used negative pressure booster, the interior of the negative pressure booster is partitioned into a constant pressure chamber into which negative pressure is introduced during the usual operation using a power piston and a variable pressure chamber in which the pressure varies. Further, during the usual braking operation with a usual step-in motion of a brake pedal, when an input shaft advances, a control valve is changed over and the atmosphere enters the variable pressure chamber. Then, the pressure difference arises between the variable pressure chamber and the constant pressure chamber and hence, the power piston is advanced. Accordingly, the negative pressure booster boosts an input of an input shaft attributed to a pedal step-in force at a given servo ratio and outputs the boosted force. Due to this output of the negative pressure booster, a master cylinder generates master cylinder pressure and a wheel cylinder is operated with the master cylinder pressure thus performing the usual braking operation.

Here, with respect to a vehicle such as a one box car or a recreational vehicle, recently, there has been observed a trend that a vehicle weight or a carrying weight is increased. Accordingly, in such a vehicle, along with the increase of the vehicle weight or the carrying weight, a brake manipulation quantity (a pedal stroke quantity) which becomes necessary during the usual braking operation is increased. In this manner, the brake manipulation quantity of a driver during the usual braking operation is increased and hence, it is difficult to achieve the favorable brake feeling.

On the other hand, in Japanese Patent Laid-open 2001-341632, there has been proposed a negative pressure booster which can obtain a large output even with a small pedal step-in force, that is, even with a small input and can perform a brake assist (hereinafter also referred to as "BA") operation in case of emergency. According to the negative pressure booster disclosed in Japanese Patent Laid-open 2001-341632, even in a case that a moving speed of an input rod corresponding to the a pedal step-in speed is larger than a corresponding moving speed during the usual braking operation, when an input which is applied to the input rod is smaller than a given value, the BA operation is not performed, and only when the input which is applied to the input rod becomes equal to or above the given value, the BA operation is performed. That is, the negative pressure booster is configured to generate an output at the time of performing the BA operation which is larger than an output generated during the usual braking operation in response to the same input. In other words, at the time of performing the BA operation, the negative pressure booster can generate the larger output even with the input smaller than the input during the usual braking operation. Here, a stroke of an input rod of the negative pressure booster is shortened compared to a stroke when the large output can be obtained with the output equal to the output during the usual braking operation.

Further, in Japanese Patent Laid-open Heill (1999)-278245, there has been also proposed a technique which sets a servo ratio at a small value during the initial phase of the operation of the negative pressure booster and sets the servo ratio at a large value during the later phase of the operation of the negative pressure booster. In the negative pressure booster disclosed in the Japanese Patent Laid-open Heill (1999)-278245, a reaction mechanism includes a reaction disc, a spring and resilient means, wherein during the usual braking operation, a reaction is transmitted to a valve plunger by way of a reaction disc during the initial phase of the braking operation so as to decrease the servo ratio, and the reaction is transmitted to the valve plunger by way of the reaction disc and the spring during the later phase of the operation of the negative pressure booster thus increasing the servo ratio. Further, due to the provision of the reaction disc and the resilient means, hysteresis which exhibits the different outputs of the negative pressure booster between at the time of stepping in the brake pedal and at the time of releasing the step-in operation is obtained. Due to this hysteresis, the braking feeling is enhanced.

Here, it is considered that by applying the above-mentioned negative pressure booster disclosed in Japanese Laid-open Patent 2001-341632 to a vehicle which requires the deceleration higher than the deceleration during the usual braking operation, the large deceleration is obtainable with the small pedal step-in force. In this case, since the pedal stroke can be shortened, the brake feeling can be enhanced.

However, in the negative pressure booster disclosed in Japanese Patent Laid-open 2001-341632, the BA operation is performed only in the quick step-in operation in which the pedal step-in speed is faster than the step-in speed during the usual braking operation and, at the same time, the pedal stroke shortening function is performed. Accordingly, unless the pedal step-in speed is fast, the pedal stroke is not shortened and hence, it is difficult to obtain the favorable brake feeling. Further, there may arise a drawback that an operation sound is generated due to the engagement or the disengagement of an engaging portion of the BA mechanism.

Further, in the above-mentioned negative pressure booster disclosed in Japanese Patent Laid-open Heill(1999)-278245, a servo ratio is set at a small value during the initial phase of the braking operation within the usual braking operation region and the servo ratio is set at a large value in the later stage of the braking operation. Accordingly, in this negative pressure booster, no consideration is made with respect to the brake system of the vehicle which requires the deceleration higher than the deceleration during the usual braking operation. Further, in this negative pressure booster, although the brake feeling is enhanced due to the hysteresis between the step-in time of the brake pedal and the brake pedal release time, no consideration is made with respect to the deterioration of the brake feeling due to an increase of the pedal stroke at the time of performing the operation with the high deceleration.

DISCLOSURE OF THE INVENTION

It is an object of the present invention to provide a negative pressure booster which can enhance the manipulation feeling by shortening a stroke of an input member in an output region which exhibits an output larger than a given output and, at the same time, has the simpler structure, can be easily assembled, and can be easily manufactured at a low cost.

To achieve such an object, a negative pressure booster of the present invention includes at least a valve body which is reciprocally disposed in the inside of a shell, a power piston which is mounted in the valve body and partitions the interior of the shell into a constant pressure chamber into which negative pressure is introduced and a variable pressure chamber into which atmosphere is introduced at the time of operating the negative pressure booster, a valve plunger which is connected to an input shaft and is slidably disposed in the inside of the valve body, a vacuum valve which controls the communication or the interruption between the constant pressure chamber and the variable pressure chamber, and an atmospheric valve which controls the interruption or the communication between the variable pressure chamber and at least the atmosphere due to the operation of the valve plunger, in which a stroke shortening mechanism is provided which shortens a manipulation stroke quantity of the input shaft in an output region with an output larger than a given output than the manipulation stroke quantity of the input shaft in the output region with the output larger than the given output when the manipulation stroke quantity of the input shaft is changed at a change rate of the manipulation stroke quantity of the input shaft with respect to the output in an output region with an output equal to or below the given output.

Further, the present invention is also characterized in that the stroke shortening mechanism is atmospheric valve opening quantity increasing means which is operated in the output region with the output larger than the given output and increases a valve opening quantity of the atmospheric valve larger than the valve opening quantity during the usual operation, and the operation of the atmospheric valve opening quantity increasing means is controlled in response to pressure corresponding to the input.

Further, the present invention is also characterized in that the pressure which controls the operation of the atmospheric valve opening quantity increasing means is pressure of the variable pressure chamber.

Further, the present invention is characterized in that the vacuum valve includes a valve element and a vacuum valve seat on which the valve element is detachably seated and, the atmospheric valve includes the valve element and an atmospheric valve seat on which the valve element is detachably seated, and the atmospheric valve opening quantity increasing means includes a valve seat member which has a vacuum valve seat mounted on one end side thereof, wherein the valve seat member is mounted in the valve body movably between a first position which is positioned in the output region with the output equal to or below the given output and a second position which is positioned in the output region with the output larger than the given output, and the movement of the valve seat member is controlled in response to the pressure of the variable pressure chamber.

Further, the present invention is characterized in that the movement of the valve seat member is controlled in response to the pressure difference between the variable pressure chamber and the constant pressure chamber.

According to the negative pressure booster of the present invention having such a constitution, with the use of the stroke shortening mechanism, in the output region which exhibits the output larger than the given output, it is possible to shorten the manipulation stroke quantity of the input shaft than the manipulation stroke quantity of the input shaft in the output region which exhibits the output larger than the given output when the manipulation stroke quantity of the input shaft is changed at a change rate of the manipulation stroke quantity of the input shaft relative to the output in the output region where the output is equal to or below the given output. Accordingly, even when the output becomes larger than the given output during the usual braking operation, it is possible to obtain the favorable manipulation feeling without increasing the stroke of the input shaft.

Further, according to the negative pressure booster of the present invention, in the output region which exhibits the output equal to or below the given output, the atmospheric valve opening quantity increasing means which constitutes the stroke shortening mechanism is not operated, while in the output region which exhibits the output equal to or below the given output, the relatively small output is generated. Further, in the output region which exhibits the output larger than the given output, the atmospheric valve opening quantity increasing means is operated to set the valve opening quantity of the atmospheric valve larger than the valve opening quantity in the output region which exhibits the output equal to or below the given output and hence, in the output region which exhibits the output larger than the given output, it is possible to generate the relatively large output. Here, since the operation of the atmospheric valve opening quantity increasing means is controlled in response to a pressure corresponding to an input from the input shaft, it is possible to operate the atmospheric valve opening quantity increasing means without being influenced by the stroke of the input shaft. Accordingly, it is possible to generate the large output without increasing the stroke of the input shaft whereby the favorable manipulation feeling can be obtained.

Further, the operation of the atmospheric valve opening quantity increasing means is controlled in response to the pressure corresponding to the input applied to the input shaft and hence, it is possible to eliminate mechanical engaging means whereby the structure of the atmospheric valve opening quantity increasing means can be simplified. Further, the atmospheric valve opening quantity increasing means can be easily assembled and can be manufactured at a low cost. Still further, since the atmospheric valve opening quantity increasing means is operated under a pressure control, the generation of an operation sound which is generated at the time of performing the operation can be suppressed.

Still further, according to the present invention, the operation of the atmospheric valve opening quantity increasing means is controlled in response to the pressure of the variable pressure chamber and hence, the pressure of the variable chamber can be directly utilized. Accordingly, the structure of the atmospheric valve opening quantity increasing means can be further simplified thus further facilitating the assembling of the atmospheric valve opening quantity increasing means.

BRIEF EXPLANATION OF DRAWINGS

FIG. 5 explains an operation of a vacuum valve seat member in the negative pressure booster of the example shown in FIG. 1, wherein FIG. 5(a) is a view showing the state at the time of performing the intermediate or high deceleration, and FIG. 5(b) is a view showing a dynamic equivalent state in FIG. 5(a);

BEST MODE FOR CARRYING OUT THE INVENTION

Hereinafter, best modes for carrying out the present invention are explained.

Figure 1:
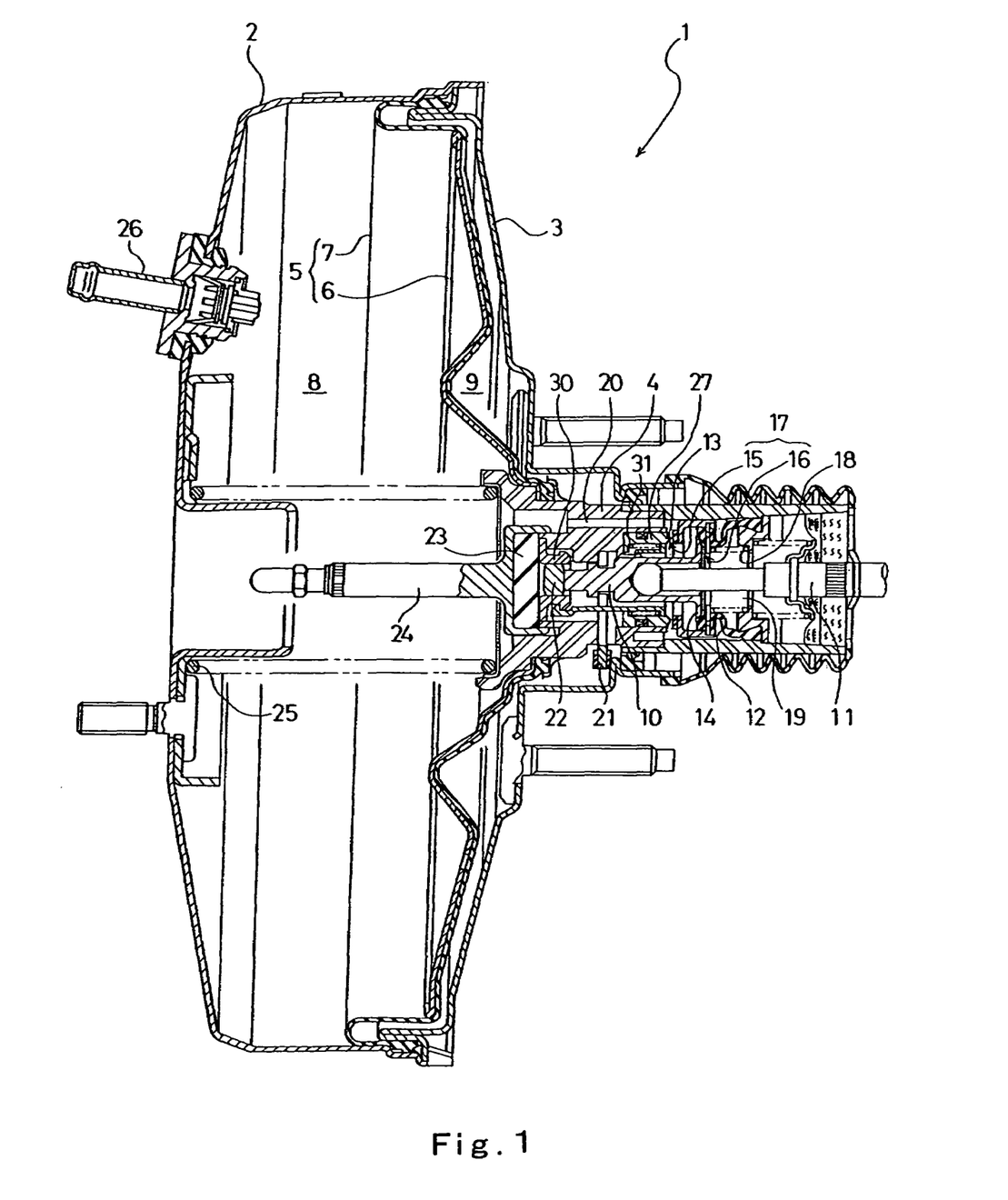
FIG. 1 is a cross-sectional view showing an example in which an embodiment of a negative pressure booster according to the present invention is applied to a brake booster in an inoperative state.
Figure 2:
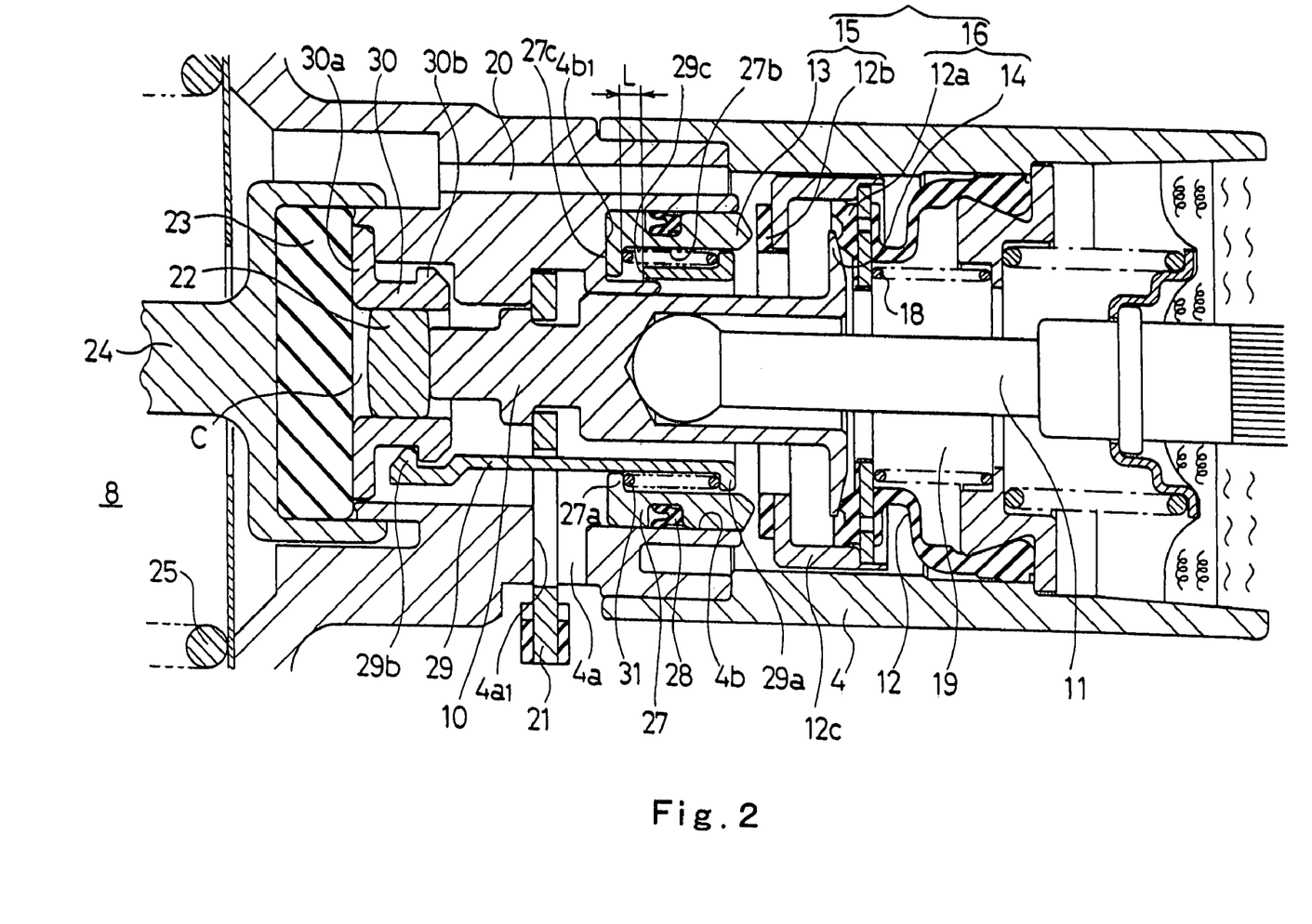
FIG. 2 is a partially enlarged cross-sectional view showing portions of a vacuum valve and an atmospheric valve in FIG. 1 in an enlarged manner.

FIG. 1 is a cross-sectional view showing an example in which an embodiment of a negative pressure booster according to the present invention is applied to a brake booster in an inoperative state, and FIG. 2 is a partially enlarged cross-sectional view showing portions of a vacuum valve and an atmospheric valve shown in FIG. 1 in an enlarged manner. Here, in the explanation made hereinafter, "front" and "rear" indicate "left" and "right" in respective drawings.

First of all, in the negative pressure booster of this embodiment, constitutional parts which are equal to corresponding constitutional parts of a conventional general negative pressure booster are explained briefly. In FIG. 1 and FIG. 2, numeral 1 indicates the negative pressure booster, numeral 2 indicates a front shell, numeral 3 indicates a rear shell, numeral 4 indicates a valve body, numeral 5 indicates a power piston, numeral 6 indicates a power piston member, numeral 7 indicates a diaphragm, numeral 8 indicates a constant pressure chamber, numeral 9 indicates a variable pressure chamber, numeral 10 indicates a valve plunger, numeral 11 indicates an input shaft, numeral 12 indicates a valve element, numeral 13 indicates a vacuum valve seat, numeral 14 indicates an atmospheric valve seat, numeral 15 indicates a vacuum valve, numeral 16 indicates an atmospheric valve, numeral 17 indicates a control valve, numeral 18 indicates a valve spring, numeral 19 indicates an atmosphere introducing passage, numeral 20 indicates a vacuum passage, numeral 21 indicates a key member, numeral 22 indicates a distance member, numeral 23 indicates a reaction disc, numeral 24 indicates an output shaft, numeral 25 indicates a return spring, and numeral 26 indicates a negative pressure introducing passage.

Here, in the same manner as the conventional general negative pressure booster, the output shaft 24 operates a piston of a master cylinder.

Next, the constitution of characterizing parts of the negative pressure booster 1 of this embodiment which are different from conventional parts are explained.

As shown in FIG. 2, in the negative pressure booster 1 of this embodiment, a vacuum valve seat member (corresponding to a valve seat member of the present invention) 27 is slidably fitted in an inner hole 4b formed in the valve body 4 in the axial direction, while the above-mentioned vacuum valve seat 13 is formed on a rear end of the vacuum valve seat member 27. Accordingly, the vacuum valve seat 13 is also movable relative to the valve body 4. Further, an annular flange 27a which projects inwardly is formed on a front end of the vacuum valve seat member 27.

Then, due to the provision of a sealing member 28 such as a cup seal or the like which is mounted on an outer peripheral surface of the vacuum valve seat member 27, an interface between an inner peripheral surface of an inner hole 4b of the valve body 4 and an outer peripheral surface of the vacuum valve seat member 27 is hermetically sealed so as to prevent at least the flow of air which advances from a front end to a rear end of the vacuum valve seat member 27. Further, a rear surface 27b and a front end surface 27c of the flange 27a of the vacuum valve seat member 27 are always communicated with the variable pressure chamber 9 and hence, the pressure of the variable pressure chamber 9 is always applied to the rear surface 27b and the front end surface 27c.

Figure 3:
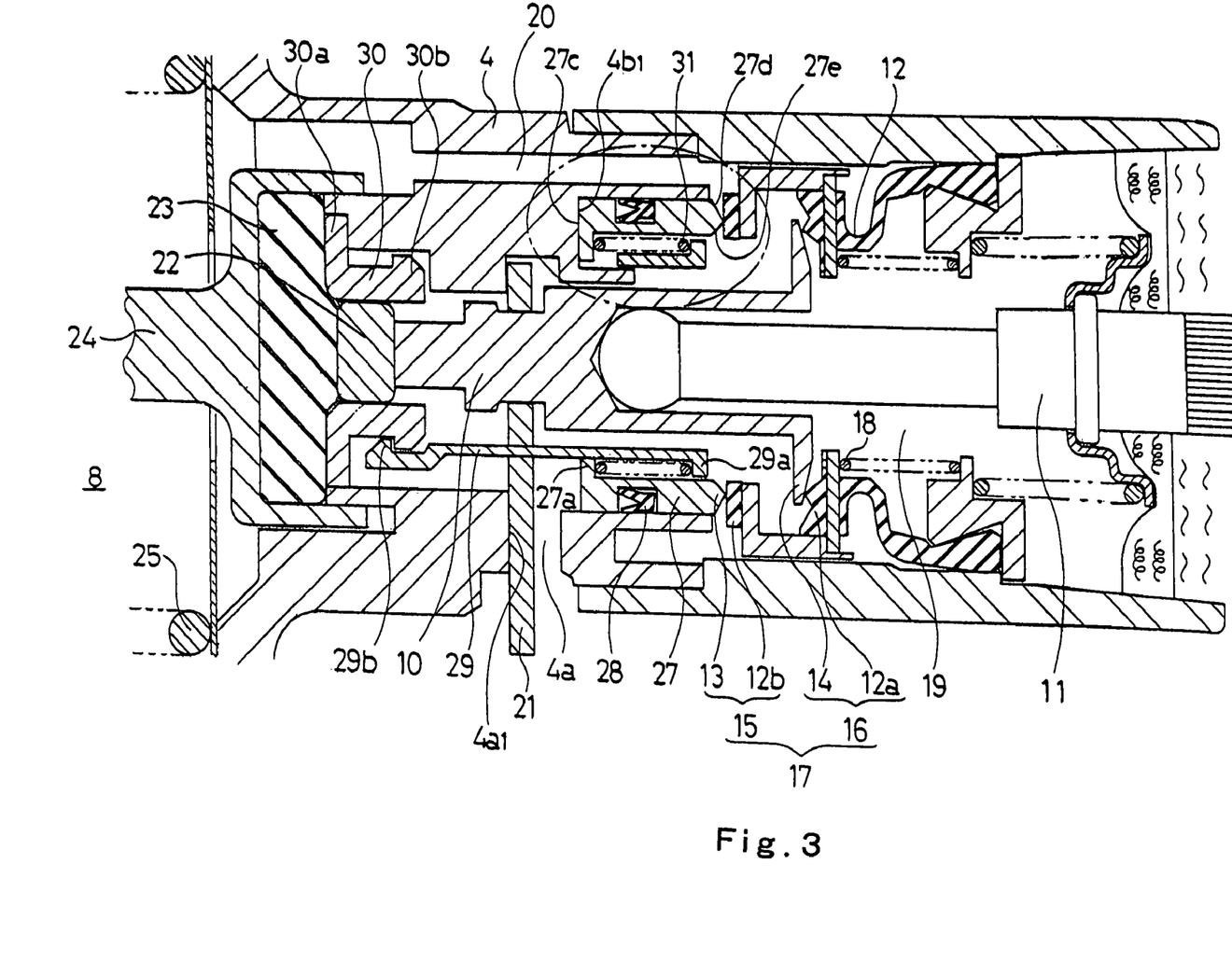
FIG. 3 is a partially enlarged cross-sectional view similar to FIG. 2 and shows a state at the time of performing a usual braking operation and a state at the time of performing the intermediate and high deceleration using the negative pressure booster of the example shown in FIG. 1 in a partially enlarged manner.

Further, in a state that the vacuum valve portion 12b of the valve element 12 is seated on the vacuum valve seat 13 as shown in FIG. 3, an annular outer rear end surface 27d of the vacuum valve seat member 27 on an outer peripheral side than the sitting position of the vacuum valve portion 12b is always communicated with the constant pressure chamber 8 and hence, the pressure of the constant pressure chamber 8 is always applied to the outer rear end surface 27d. Further, in a state that the vacuum valve portion 12b of the valve element 12 is seated on the vacuum valve seat 13, with respect to the vacuum valve seat member 27, an annular inner rear end surface 27e which is arranged on an inner peripheral side than the seated position of the vacuum valve portion 12b is communicated with the variable pressure chamber 9 and hence, the pressure of the variable chamber 9 is applied to the inner rear end surface 27e. Accordingly, during the operation of the negative pressure booster 1, when a pressure difference arises between the variable chamber 9 and the constant pressure chamber 8, a force generated due to the pressure difference is applied to the vacuum valve seat member 27 in the rearward direction.

To a center of a front end portion of the valve body 4, as shown in FIG. 2, a cylindrical holder 30 is integrally fixed with the valve body 4. On a front end portion of the holder 30, an annular flange 30a which comes into contact with the reaction disc 23 is formed in an outwardly projecting manner. Further, on a rear end portion of the holder 30, a holder-side hook portion 30b is formed in an outwardly projecting manner.

The distance member 22 is slidably disposed in the inside of the holder 30. During the inoperative state of the negative pressure booster 1, between a front end surface of the distance member 22 and a rear end surface of the reaction disc 23 which faces the front end surface of the distance member 22 in an opposed manner, a given gap C extending in the axial direction is set.

A cylindrical member 29 is disposed in the inside of the axial-direction hole of the valve body 4. An annular flange 29a which projects outwardly is formed on a rear end portion of the cylindrical member 29, while a cylindrical-member-side hook portion 29b which is engageable with a holder-side hook portion 30b in the axial direction are formed on the front end portion of the cylindrical member 29 in an outwardly projecting manner. Further, between a flange 27a of the vacuum valve seat member 27 and a flange 29a of the cylindrical member 29, a spring 31 having a spring constant K is disposed in a contracted manner and the cylindrical member 29 is always biased rearwardly due to a spring load of the spring 31.

Then, during the usual operation, as shown in FIG. 2, since the cylindrical-member-side hook portion 29b is axially engaged with holder-side hook portion 30b, the further rearward movement of the cylindrical member 29 is prevented. Accordingly, the integral axial movement of the holder 30 and the cylindrical member 29 with respect to the valve body 4 is made impossible.

On the other hand, the vacuum valve seat member 27 is always biased frontwardly due to the spring load of the spring 31 and hence, as shown in FIG. 2, during the usual operation, the vacuum valve seat member 27 is set at a first position where a portion of the front end of the vacuum valve seat member 27 is brought into contact with a bottom portion 4b1 of an inner hole 4b of the valve body 4. Accordingly, the vacuum valve seat 13 one the rear end portion of the vacuum valve seat member 27 is, during the usual operation, positioned at the first position shown in FIG. 2 with respect to the valve body 4. The vacuum valve seat 13 which is positioned in the above-mentioned manner is set to assume the same state as a vacuum valve seat formed on a valve body 4 of a conventional general negative pressure booster.

Further, the cylindrical-member-side hook portion 29b is axially engaged with the holder-side hook portion 30b and, at the same time, the front end of the vacuum valve seat member 27 is brought into contact with the valve body 4. Further, in a state shown in FIG. 1, FIG. 2 and FIG. 4(a) in which a force attributed to the pressure difference is not applied to the vacuum valve seat member 27, the spring load FS of the spring 31 is set to a set spring load Fs0 which is preliminarily determined.

Further, when the input is applied to the input shaft 11 due to the step-in operation of the brake pedal and the negative pressure booster 1 is operated, the atmosphere is introduced into the variable pressure chamber 9 in the same manner as the conventional general negative pressure booster and hence, the pressure difference is generated between the variable pressure chamber 9 and the constant pressure chamber 8. Accordingly, a force attributed to the pressure difference is applied to the vacuum valve seat member 27 in the rearward direction. The force has a magnitude which corresponds to the pressure difference between the variable pressure chamber 9 and the constant pressure chamber 8, that is, a magnitude of the input applied to the input shaft 11.

Then, assuming that the force attributed to the pressure difference is equal to or less than a sum of the above-mentioned set spring load FS0 and the spring load fs of the valve spring 18 of the valve element 12 at this point of time and the input which is applied to the input shaft 11 is equal to or below a predetermined input F0 which is preliminarily determined, the vacuum valve seat member 27 is not moved with respect to the valve body 4 and holds the first position shown in FIG. 2, FIG. 3 and FIG. 4(b). Further, when the force attributed to the pressure difference becomes larger than the sum of the set spring load FS0 and the spring load fS and the input which is applied to the input shaft 11 becomes larger than the predetermined input F0, the vacuum valve seat member 27 is moved rearwardly relative to the valve body 4 and the cylindrical member 29 while pushing the vacuum valve portion 12b of the valve element 12. Accordingly, due to the rearward movement of the vacuum valve seat member 27, the vacuum valve seat 13 projects rearwardly from the position during the usual operation.

Figure 4:
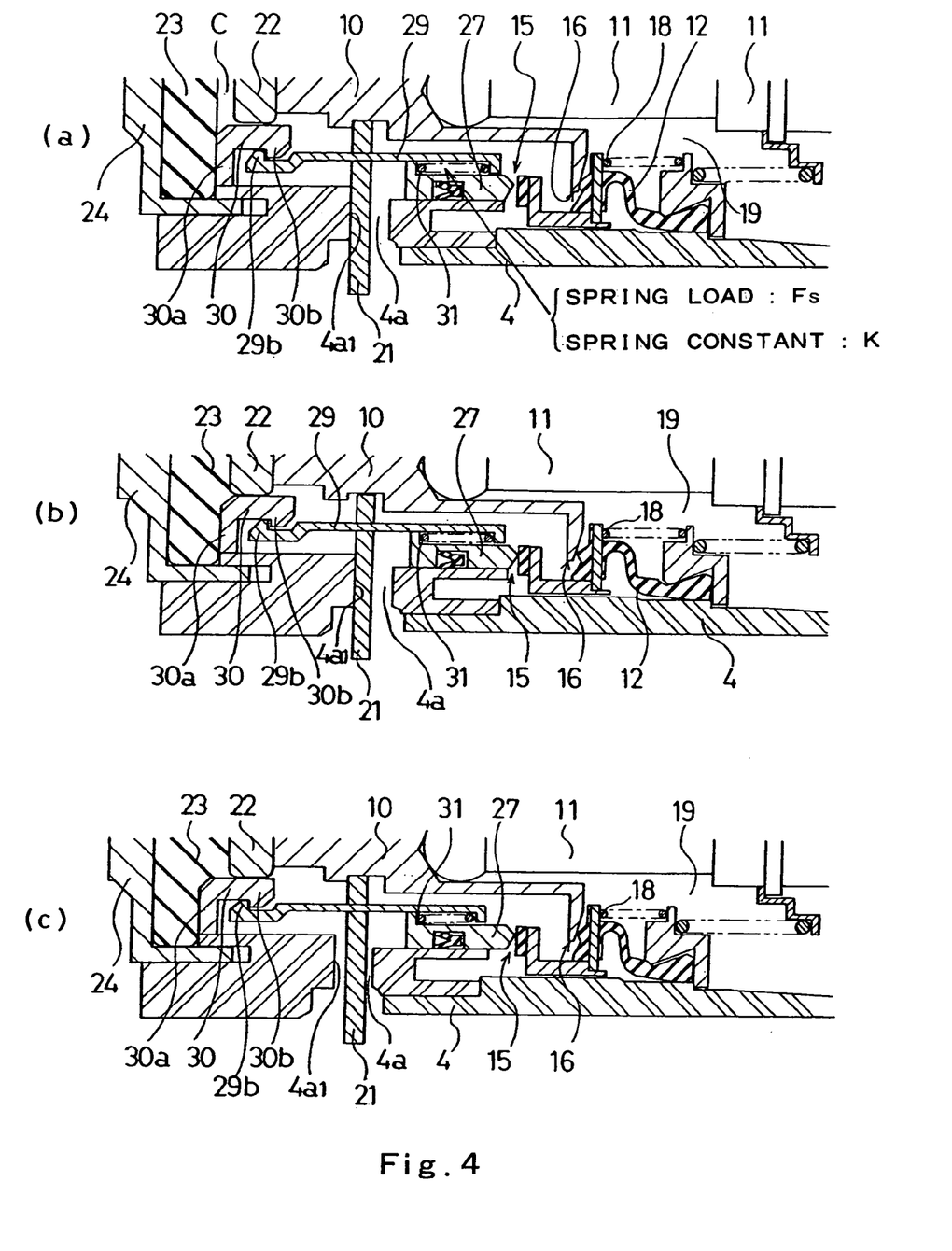
FIG. 4 partially shows the state of the negative pressure booster of the example shown in FIG. 1, wherein FIG. 4(*a*) is the view showing an inoperative state, FIG. 4(*b*) shows a state during the usual braking operation, and FIG. 4(*c*) shows the state at the time of performing the intermediate or high deceleration.
Figure 5:
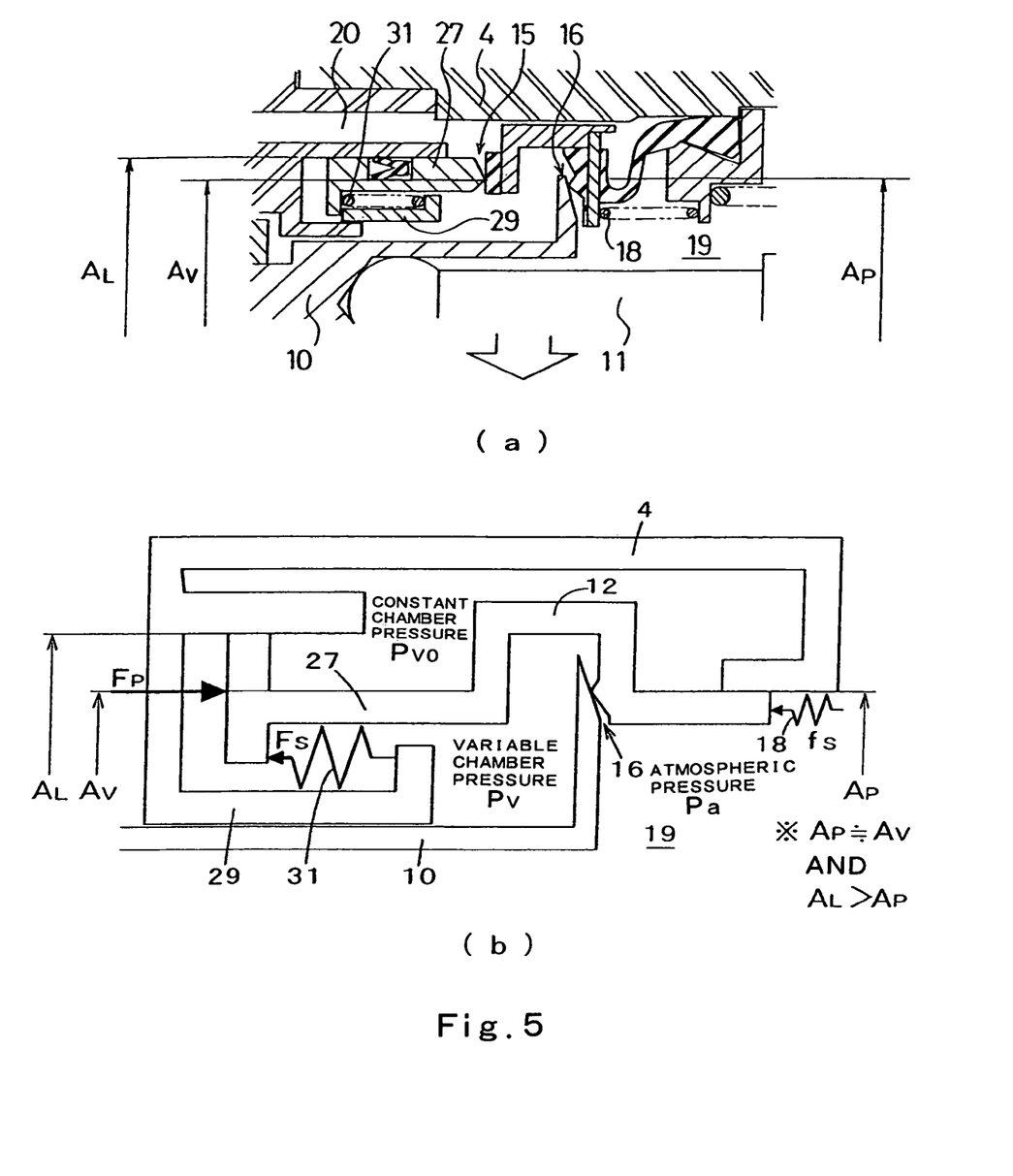

In this case, as shown in FIG. 4(c) and FIG. 5(a), when a rear surface of the flange 27a of the vacuum valve seat member 27 is brought into contact with a front end 29c of a cylindrical portion of the cylindrical member 29, the vacuum valve seat member 27 does not move rearwardly any more and is set at a second position. Accordingly, the vacuum valve seat 13 formed on the rear end portion of the vacuum valve seat member 27 is, when the input is larger than the predetermined input F0, positioned at the second position shown in FIG. 4(c) and FIG. 5(a) with respect to the valve body 4. A stroke quantity of the vacuum valve seat member 27 during this movement is within the range of a gap L (L being shown in FIG. 2) between a rear surface of the flange 27a and a front end 29c of the cylindrical portion of the cylindrical member 29 when the negative pressure booster 1 shown in FIG. 1, FIG. 2 and FIG. 4(a) is not operated.

Here, when the vacuum valve seat member 27 strokes rearwardly relative to the valve body 4, an atmospheric valve portion 12a of the atmospheric valve 16 also strokes rearwardly relative to the valve body 4 by an amount equal to a relative stroke quantity L" of the vacuum valve seat member 27. Accordingly, a valve opening quantity between the atmospheric valve portion 12a and the atmospheric valve seat 14 is, compared to the case in which it is assumed that the vacuum valve seat member 27 has no relative stroke, increased by an amount corresponding to the relative stroke quantity L" of the vacuum valve seat member 27 provided that the input stroke quantity of the input shaft 11 is equal. That is, in an intermediate load state in which both of the vacuum valve 15 and the atmospheric valve 16 are closed and balanced, when the input stroke quantity of the input shaft 11 is equal, the respective strokes of the valve body 4 and the piston member 6 of the power piston 5 are increased by an amount corresponding to the relative stroke quantity L" of the vacuum valve seat member 27 compared with the case in which it is assumed that the vacuum valve seat member 27 has no relative movement. In other words, assuming that the respective stroke quantities of the valve body 4 and the piston member 6 of the power piston 5 are equal between the case in which the vacuum valve seat member 27 has the relative stroke and the case in which it is assumed that the vacuum valve seat member 27 has no relative stroke, the case in which the vacuum valve seat member 27 has the relative stroke allows the stroke of the input shaft 11 to be shortened by an amount corresponding to the relative stroke quantity L" of the vacuum valve seat member 27.

Figure 6:
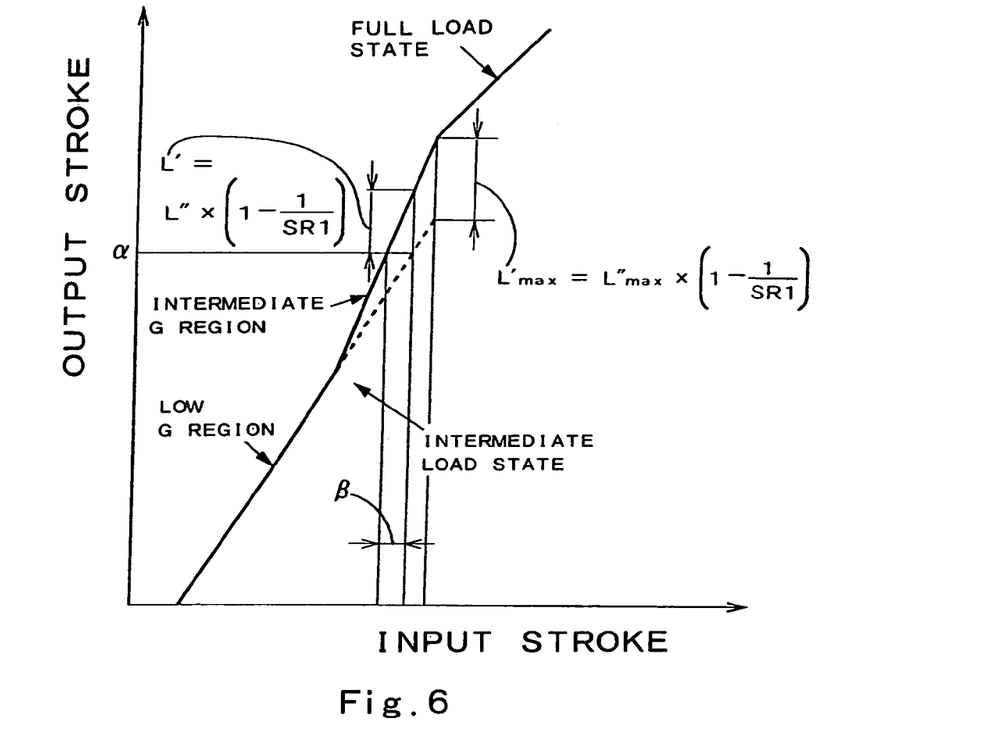
FIG. 6 is a view showing input/output stroke characteristics of the negative pressure booster of the example shown in FIG. 1.

On the other hand, an output stroke of the output shaft 24 during the above-mentioned relative stroking of the vacuum valve seat member 27 is also, assuming that the input stroke quantity of the input shaft 11 is equal in the above-mentioned manner, increased along with the increase of respective strokes of the valve body 4 and the piston member 6 of the power piston 5. However, in the intermediate load condition, as shown in FIG. 4(c), the reaction disc 23 bulges toward the distance member 22 and a thickness of the reaction disc 23 in the axial direction is reduced and hence, the output stroke of the output shaft 24 becomes smaller than the increased relative stroke quantity L" of the above-mentioned respective strokes of the valve body 4 and the piston member 6 of the piston 5. Accordingly, an increase quantity L' of the output stroke of the output shaft 24 is given by a following formula as shown in FIG. 6.

$$L' = L'' \times [1 - (1/SR1)] \quad (1)$$

Here, SR1 indicates a servo ratio SR1 in the low deceleration (low G) region.

To explain a process for obtaining the formula (1), when the braking manipulation is performed in the intermediate deceleration (intermediate G) region, the reaction disc 23 bulges toward the distance member 22 and a thickness thereof in the axial direction is decreased as mentioned above. Here, the axially decreased quantity of the thickness is assumed as L1. Further, assuming a cross-sectional area of the distance member 22 as A1 and a cross-sectional area of the reaction disc 23 as A2, the respective strokes of the valve body 4 and the piston member 6 of the power piston 5 are increased by an amount corresponding to the stroke quantity L" as described above and hence, a following relationship is established.

$$L'' \times A1 = L1 \times A2 \quad (2)$$

Here, since the servo ratio SR1 is (A2/A1) and hence, by modifying the formula (2) with respect to L1, a following relationship is established.

$$L1 = L'' \times (1/SR1) \quad (3)$$

That is, along with the bulging of the reaction disc 23, the axial thickness of the reaction disc 23 is decreased by an amount of L''/SR1. Accordingly, the increased stroke quantity L' of the output stroke of the output shaft 24 is expressed by a following formula (4).

$$L' = L'' - (L''/SR1) = L'' \times [1 - (1/SR1)] \quad (4)$$

Then, in the intermediate deceleration (intermediate G) region which constitutes an intermediate load state shown in FIG. 6, assuming that the stroke of the output shaft 24 has an equal stroke quantity a between the case in which the vacuum valve seat member 27 has the relative stroke (indicated by a solid line in FIG. 6) and the case in which it is assumed that the vacuum valve seat member 27 has no relative stroke (indicated by a dotted line), the case in which the vacuum valve seat member 27 has the relative stroke allows the stroke of the input shaft 11 to be shortened by a stroke quantity β.

Here, the negative pressure booster 1 of this embodiment is set such that immediately before the rear surface of the flange 27a of the vacuum valve seat member 27 comes into contact with the front end 29c of the cylindrical portion of the cylindrical member 29, the negative pressure booster 1 assumes a full load state, that is, the pressure of the variable pressure chamber 9 which is applied to the vacuum valve seat member 27 assumes the atmospheric pressure. Accordingly, the maximum stroke quantity L''max of the relative stroke quantity L'' of the vacuum valve seat member 27 relative to the valve body 4 during the above-mentioned relative movement of the vacuum valve seat member 27 becomes slightly smaller than the gap L (L''max<L). That is, the maximum shortened stroke quantity of the input shaft 11 is given by L''max.

Further, as shown in FIG. 6, the maximum stroke quantity L' max which increases the output stroke of the output shaft 24 in this case is expressed by a following formula (5).

$$L'max = L''max \times [1 - (1/SR1)] \quad (5)$$

Then, since the vacuum valve seat member 27 projects rearwardly while pushing the vacuum valve portion 12b of the valve element 12, the valve element 12 moves rearwardly and the atmospheric valve portion 12a of the valve element 12 also moves in the rearward direction. Accordingly, the atmospheric valve portion 12a is further largely separated from the atmospheric valve seat 14 than a state shown in FIG. 3 and FIG. 4(b) in which the atmospheric valve 16 is closed during the usual braking operation. That is, the vacuum valve seat member 27 is configured to increase a valve opening quantity of the atmospheric valve 16. In this manner, the stroke shortening mechanism, that is, the atmospheric valve valve-opening-quantity increasing means of the present invention is constituted of the vacuum valve seat member 27 and the spring 31, and the operation of the atmospheric valve valve-opening-quantity increasing means is controlled in response to the pressure difference between the variable pressure chamber 9 and the constant pressure chamber 8.

The movement of the vacuum valve seat member 27 is specifically explained. Here considered is a force attributed to the pressure difference which is applied to the vacuum valve seat member 27 in the intermediate load state in which, as shown in FIG. 5(a), the vacuum valve seat member 27 moves and both of the vacuum valve 15 and the atmospheric valve 16 are closed so that the control valve 17 assumes a balanced state. Here, the balanced state of the control valve 17 shown in FIG. 5(a) is, considered to be the state in which since the vacuum valve seat member 27 and the valve element 12 are brought into contact with each other and are integrally formed forces applied to the vacuum valve seat member 27 and the valve element 12 which are integrally formed with each other as shown in FIG. 5(b) are equivalent.

Here, in FIG. 5(b), assume the force attributed to the pressure difference between the pressures applied to the vacuum valve seat member 27 and the valve element 12 as FP, the pressure of the constant pressure chamber 8 as PV0, the pressure of the variable pressure chamber 9 as PV, the atmospheric pressure as Pa, an effective pressure receiving area of the annular front end surface 27c of the vacuum valve seat member 27 which receives the variable-pressure-chamber pressure PV as AL, an effective pressure receiving area of the annular rear end surface 27e inside a sitting point of the vacuum valve seat member 27 at the time of sitting of the vacuum valve portion on the vacuum valve seat member 27 and the rear surface 27b of the flange 27a which receives the variable-pressure-chamber pressure PV as AV, and an effective pressure receiving area of the valve element 12 which receives the atmospheric pressure Pa as AP. Further, assume that the relationship AP≈AV is set and, at the same time, a diameter of the sitting position of the atmospheric valve portion 12a on the atmospheric valve seat 14 is set to substantially agree with an effective diameter of the effective pressure receiving area AP of the valve element 12. In this case, the force FP attributed to the pressure difference between the pressures applied to the vacuum valve seat member 27 and the valve element 12 is expressed by a following formula (6).

$$FP = (PV - PV0) \cdot (AL - AV) \quad (6)$$

Here, this force FP pushes the vacuum valve seat member 27 and the valve element 12 rearwardly. on the other hand, the spring load FS of the spring 31 and the spring load fS of the valve spring 18 push the vacuum valve seat member 27 and the valve element 12 frontwardly. Accordingly, when the above-mentioned force FP becomes larger than the sum of these spring loads (FS+fS), the vacuum valve seat member 27 moves rearwardly. Here, an absolute value of the spring load fS of the valve spring 18 is small and, at the same time, is set to an extremely small value compared with the spring load FS of the spring 31 (FS>>fS) and hence, when the force FP is substantially larger than the spring load FS (FP>FS), the vacuum valve seat member 27 moves rearwardly, while when the force FP is equal to or below the spring load FS (FP≦FS), the vacuum valve seat member 27 does not move rearwardly.

Then, when the pressure of the variable pressure chamber 9 is elevated and the force FP becomes larger than the set spring load FS0, the vacuum valve seat member 27 starts the rearward movement. The pressure PV of the variable pressure chamber 9 when the vacuum valve seat member 27 moves is expressed by a following formula (7).

$$PV > [FS/(AL - AV)] + PV0 \quad (7)$$

In this case, it is needless to say that it is necessary to set the relationships AL>AV and AL>AP to move the vacuum valve seat member 27.

Figure 7:
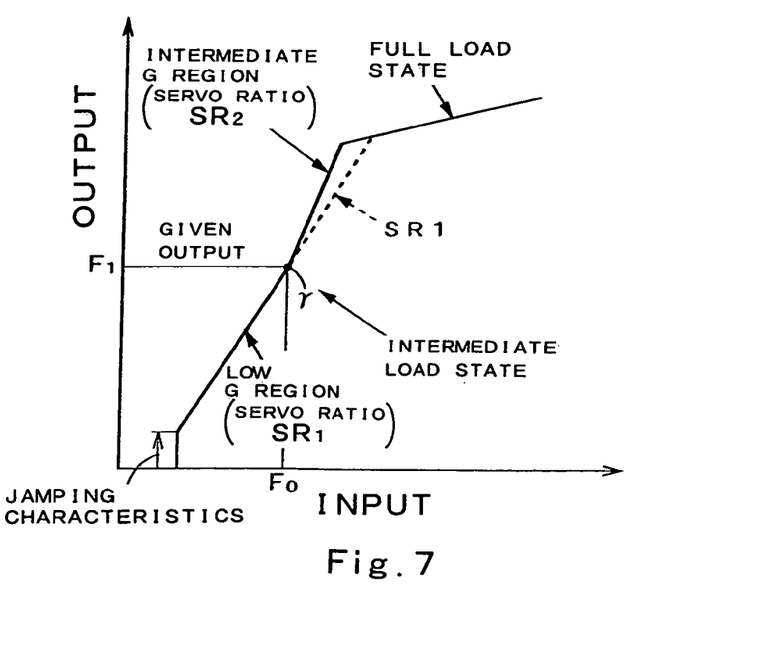
FIG. 7 is a view showing input/output characteristics of the negative pressure booster of the example shown in FIG. 1.

A region of the pressure PV of the variable pressure chamber 9 which does not satisfy the formula (7) is an output region in which the output of the negative pressure booster 1 is equal to or less than the given output F1 in the input-output characteristics shown in FIG. 7. In this region, the input is relatively small, and the deceleration attributed to braking is equal to the deceleration during the usual braking operation in the conventional vehicle of relatively low weight (including the carrying weight), wherein the region is set as a low deceleration (low G) region with respect to the relatively high weight (including the carrying weight) vehicle. This low deceleration (low G) region is the usual braking operation region. In this low G region, the servo ratio is set to a relatively small servo ratio SR1 substantially equal to the servo ratio at the time of performing the conventional braking operation.

Further, the region of pressure PV of the variable pressure chamber 9 which satisfies the formula (7) is an output region in which the output of the negative pressure booster 1 is larger than the given output F1. In this region, the input is relatively large and the deceleration attributed to the braking is set as the intermediate deceleration (intermediate G) region with respect to the vehicle of relatively high weight (including the carrying weight). In this intermediate deceleration (intermediate G) region, the vacuum valve seat member 27 projects rearwardly and pushes the valve element 12 rearwardly. As the result, the valve opening quantity of the atmospheric valve 16 is increased compared with the usual braking operation time with the same input and hence, the servo ratio becomes a servo ratio SR2 which is larger than the servo ratio SR1 of the conventional usual braking operation time in which the servo ratio is set in the low deceleration speed (low G) region (SR2>SR1).

The servo ratio SR2 is explained in detail. In the negative pressure booster 1 of this embodiment, the serve ratio SR2 is obtained in a following manner. That is, the valve opening quantity of the atmospheric valve 16 is slightly increased as described above so as to elevate the pressure of the variable pressure chamber 9 thus slightly jumping up the output. Then, by repeating this jumping up of the output in a state of servo ratio SR1 thus elevating the output in a step-like manner with a small step quantity microscopically, it is possible to obtain the servo ratio SR2 which is larger than servo ratio SR1 in appearance macroscopically.

Here, in the negative pressure booster 1 of this embodiment, both of a spring constant K and the set spring load FS0 of the spring 31 which biase the vacuum valve seat member 27 can be arbitrarily set. Further, in the input-output characteristics of the negative pressure booster 1 of this embodiment shown in FIG. 7, the set input F0 which is an input of a change point (ratio point) γ at which the servo ratio is changed from the small servo ratio SR1 to the large servo ratio SR2 can be shifted upwardly and downwardly by changing the set spring load FS0 of the spring 31. Further, the servo ratio SR can be increased or decreased by changing the spring constant K of the spring 31. Further, the above-mentioned gap L also can be arbitrarily determined.

Accordingly, in the negative pressure booster 1 of this embodiment, by setting the spring constant K and the set spring load FS0 of the spring 31 and the stroke quantity L of the vacuum valve seat member 27 corresponding to a vehicle on which the negative pressure booster 1 is mounted, it is possible to easily and properly apply the negative pressure booster 1 of one type to brake boosters of various kinds of vehicles corresponding to the types of vehicles.

Next, the manner of operation of the negative pressure booster 1 of this example is explained.

(Negative Pressure Booster in Operative State)

The negative pressure is always introduced into the constant pressure chamber 8 of the negative pressure booster 1 through the negative pressure introducing passage 26. Further, in the inoperative state of the negative pressure booster 1 shown in FIG. 1 and FIG. 2, the key member 21 is brought into contact with the rear shell 3 to assume a retraction limit. Accordingly, the valve body 4 and a valve plunger 6 assume the retraction limit due to the key member 21 and, further, the power piston 5, the input shaft 11 and the output shaft 24 also assume a retraction limit. In this inoperative state, the atmospheric valve portion 12a of the valve element 12 is seated on the atmospheric valve seat 14 so as to close the atmospheric valve 16, while the vacuum valve portion 12b of the valve element 12 is separated from the first vacuum valve seat 13 and the second vacuum valve seat 27g so as to open the vacuum valve 15. Accordingly, the variable pressure chamber 9 is interrupted from the atmosphere and is communicated with the constant pressure chamber 8 and hence, the negative pressure is introduced into the variable pressure chamber 9 whereby no substantial pressure difference is generated between the variable pressure chamber 9 and the constant pressure chamber 8.

Accordingly, the force attributed to the pressure difference is not rearwardly applied to the vacuum valve seat member 27 and hence, the vacuum valve seat member 27 is positioned at the position shown in FIG. 2 where a portion of the front end face 27c is brought into contact with the bottom portion 4b1 of the inner hole 4b of the valve body 4.

(The Negative Pressure Booster During Usual Braking Operation in Low Deceleration Region)

When the brake pedal is stepped in at the step-in speed during the usual braking operation to perform the usual braking, the input shaft 11 advances and hence, the valve plunger 10 advances. Along with the advancing of the valve plunger 10, the vacuum valve portion 12b of the valve element 12 is seated on the vacuum valve seat 13 so as to close the vacuum valve 15 and, at the same time, the atmospheric valve seat 14 is separated from the atmospheric valve portion 12a of the valve element 12 so as to open the atmospheric valve 16. That is, the variable pressure chamber 9 is interrupted form the constant pressure chamber 8 and, at the same time, is communicated with the atmosphere. Accordingly, the atmosphere is introduced into the variable pressure chamber 9 through the atmosphere introducing passage 19 and the opened atmospheric valve 16. As a result, the pressure difference is generated between the variable pressure chamber 9 and the constant pressure chamber 8 and hence, the power piston 5 advances. Further, the output shaft 24 advances by way of the valve body 4 and hence, the piston of the master cylinder not shown in the drawing advances.

Further, although the distance member 22 also advances along with the advancing of the valve plunger 10, the distance member 22 is not yet brought into contact with the reaction disc 23 due to the gap C. Accordingly, the reaction from the output shaft 24 is not transmitted to the distance member 22 from the reaction disc 23 and hence, the reaction is not also transmitted to the brake pedal by way of the valve plunger 10 and the input shaft 11. When the input shaft 11 further advances, the power piston 5 also further advances, and the piston of the master cylinder further advances by way of the valve body 4 and the output shaft 24.

When a lost stroke of the brake system following the master cylinder is eliminated, the negative pressure booster 1 substantially generates an output and hence, the master cylinder generates a master cylinder pressure (hydraulic pressure) due to such an output, and the wheel cylinder is operated with the master cylinder pressure and the braking force is generated.

Here, due to the reaction applied to the output shft 24 from the master cylinder, the reaction disc 23 bulges rearwardly as shown in FIG. 3 and FIG. 4(b) and hence, the gap C is eliminated and the reaction disc 23 is brought into contact with the distance member 22. Accordingly, the reaction from the output shaft 24 is transmitted to the distance member 22 from the reaction disc 23 and, further, the reaction is transmitted to the brake pedal by way of the valve plunger 10 and the input shaft 11 and is detected or perceived by a driver. That is, as shown in FIG. 7, the negative pressure booster 1 exhibits the jumping characteristics during the usual braking operation. This jumping characteristics are substantially equal to the jumping characteristics of the conventional general negative pressure booster.

When the usual braking is performed within the low deceleration (low G) region, the input of the negative pressure booster 1 attributed to the pedal step-in force is relatively small. This low deceleration (low G) region is the output region where the output is equal to or below the given output and, as mentioned above, the pressure PV of the variable pressure chamber 9 does not satisfy the formula (7). Accordingly, the vacuum valve seat member 27 does not move and the servo ratio is set to the relatively small servo ratio SR1 which is substantially equal to the servo ratio during the conventional usual braking operation. Accordingly, when the output of the negative pressure booster 1 has the magnitude which is obtained by boosting the input of the input shaft 11 due to the pedal step-in force with the servo ratio SR1, the atmospheric valve portion 12a is seated on the atmospheric valve seat 14 thus also closing the atmospheric valve 16 whereby the balanced state of the intermediate load is established (the vacuum valve 15 is already closed due to the seating of the vacuum valve portion 12b on the vacuum valve seat 13). In this manner, in the low deceleration (low G) region shown in FIG. 7, the usual braking is performed with the brake force which is obtained by boosting the pedal step-in force during the usual braking operation with the servo ratio SR1.

When the brake pedal is reduced to release the usual braking from a state in which both of the atmospheric valve 16 and the vacuum valve 15 of the negative pressure booster 1 are closed during the usual braking operating shown in FIG. 3 and FIG. 4(b), both of the input shaft 11 and the valve plunger 10 retract. However, since air (atmosphere) is introduced into the variable pressure chamber 9, the valve body 4 and the vacuum valve seat member 27 do not retract immediately. Accordingly, the atmospheric valve seat 14 of the valve plunger 10 pushes the atmospheric valve portion 12a of the valve element 12 rearwardly and hence, the vacuum valve portion 12b is separated from the vacuum valve seat 13g so as to open the vacuum valve 15. Then, the variable pressure chamber 9 is communicated with the constant pressure chamber 8 by way of the opened vacuum valve 15 and the vacuum passage 20 and hence, air introduced into the variable pressure chamber 9 is discharged to a vacuum source by way of the opened vacuum valve 15, the vacuum passage 20, the constant pressure chamber 8 and the negative pressure introducing passage 26.

Accordingly, the pressure of the variable pressure chamber 9 is lowered and the pressure difference between the variable pressure chamber 9 and the constant pressure chamber 8 becomes small and hence, due to the spring force of the return spring 25, the power piston 5, the valve body 4 and the output shaft 24 retract. Along with the retracting of the valve body 4, due to a spring force of a return spring of the piston of the master cylinder, the piston of the master cylinder and the output shaft 24 retract and hence, the release of the usual braking is started.

When the key member 21 is brought into contact with the rear shell 3 as shown in FIG. 1, the key member 21 is stopped and does not retract further. However, the valve body 4, the vacuum valve seat member 27, the valve plunger 10 and the input shaft 11 retract further. Then, the valve plunger 10 is brought into contact with the key member 21 as shown in FIG. 2 and does not retract further. Further, the front end 4a1 of the key groove 4a of the valve body 4 is brought into contact with the key member 21 as shown in FIG. 2 and the valve body 4 does not retract further. In this manner, the negative pressure booster 1 assumes the initial inactive state shown in FIG. 1, FIG. 2 and FIG. 4(a). Accordingly, the master cylinder assumes the inoperative state and hence, the master cylinder pressure is eliminated and, at the same time, the wheel cylinder becomes inoperative and the braking force is eliminated whereby the usual braking is released.

(The Negative Pressure Booster During Usual Braking Operation in Intermediate Deceleration Region)

In performing the usual braking operation in the intermediate deceleration region which exhibits the larger deceleration than the low deceleration (low G) during the usual braking operation, the input of the negative pressure booster 1 by the pedal step-in operation is set larger than the input during the usual braking operation in the low deceleration (low G) region. Although the pressure Pv of the variable pressure chamber 9 is increased along with the increase of the input to the negative pressure booster 1, when the input becomes a value equal to or above the predetermined input F0 in which the pressure PV of the variable pressure chamber 9 satisfies the formula (7) in FIG. 7, the input-output characteristics of the negative pressure booster 1 assume the intermediate deceleration (intermediate G) region which is an output region in which the output becomes larger than the given output.

In this intermediate deceleration (intermediate G) region, the pressure Pv of the variable pressure chamber 9 satisfies the formula (7) and hence, the vacuum valve seat member 27 moves rearwardly while pushing the valve element 12. Accordingly, the atmospheric valve portion 12a is largely separated from the atmospheric valve seat 14 than the usual operation time and hence, the atmospheric valve 16 is largely opened. Accordingly, in the intermediate G region shown in FIG. 7, the serve ratio assumes the servo ratio SR2 which is larger than the servo ratio during the conventional usual braking operation described previously. That is, when the output of negative pressure booster 1 becomes the magnitude obtained by boosting the input of the input shaft 11 by the serve ratio SR2, in the same manner as mentioned previously, the atmospheric valve portion 12a is seated on the atmospheric valve seat 14 and the atmospheric valve 16 is closed thus establishing the balanced state of the intermediate load (the vacuum valve 15 being already closed as the vacuum valve portion 12b is seated on the vacuum valve seat 13). In this manner, in the intermediate deceleration (intermediate G) region, the braking is performed with the braking force which is obtained by boosting the pedal step-in force by servo ratio SR2 and is larger than the braking force during the usual braking operation in the low deceleration (low G). In this case, the negative pressure booster 1 can obtain, in the intermediate deceleration (intermediate G) region, the output larger than the output during the usual braking operation using the pedal step-in force, that is, the large input of the negative pressure booster 1 and is equal to the input during the usual braking operation by servo ratio SR1.

Further, during the operation in the intermediate deceleration (intermediate G) region, the vacuum valve seat member 27 moves rearwardly by the stroke quantity L" compared to the operation in the low deceleration (low G) region and hence, the output stroke is increased corresponding to the stroke quantity L. In other words, as shown in FIG. 6, to obtain the same stroke α, the input stroke quantity in the intermediate deceleration (intermediate G) region indicated by a solid line in FIG. 7 is made smaller than the input stroke quantity in the low deceleration (low G) region indicated by a dotted line when the output stroke is changed at a change rate (inclination) of the input stroke relative to the output stroke during the usual braking operation with the servo ratio SR1 by a stroke quantity β whereby the stroke of the input shaft 11, that is, the stroke of the brake pedal can be shortened.

By releasing the brake pedal to release the usual braking from a state in which the atmospheric valve 16 and the vacuum valve 15 of the negative pressure booster 1 are closed during the operation of the vacuum valve seat member 27 shown in FIG. 4(c) and FIG. 5(a), the vacuum valve 15 is opened in the same manner as mentioned above, and air which is introduced in the variable pressure chamber 9 is discharged to the vacuum source by way of the opened vacuum valve 15, the vacuum passage 20, the constant pressure chamber 8 and the negative pressure introducing passage 26.

Accordingly, the pressure of the variable pressure chamber 9 is lowered in the same member as described above and due to the spring force of the return spring 25, the power piston 5, the valve body 4 and the output shaft 24 retract. Along with the retracting of the valve body 4, due to a spring force of a return spring of the piston of the master cylinder, the piston of the master cylinder and the output shaft 24 retract and hence, the release of the usual braking is started.

When the pressure Pv of the variable pressure chamber 9 does not satisfy the formula (7), due to the spring load FS of the spring 31, the vacuum valve seat member 27 moves frontwardly relative to the valve body 4 and hence, the vacuum valve seat member 27 assumes the inoperative position shown in FIG. 2. Accordingly, the vacuum valve portion 12b is largely separated from the vacuum valve seat 13g and the vacuum valve 15 is largely opened. Accordingly, air in the variable pressure chamber 9 is largely discharged and hence, the negative pressure booster 1 assumes the usual brake operating state in the low deceleration (low G) region. Thereafter, the operation is performed in the same manner as the above-mentioned usual braking operation in the low deceleration (low G). Finally, all of the moved members of the negative pressure booster 1 assume the inoperative position shown in FIG. 2 and hence, the braking attributed to the input larger than the braking during the usual braking operation in the low deceleration (low G) region is released.

In this manner, according to the negative pressure booster 1 which is applied to the brake system, in obtaining the large stroke of the output shaft 24 in the intermediate deceleration (intermediate G) region, it is possible to shorten the stroke quantity of the input shaft 1 than the stroke quantity necessary for obtaining the large stroke when the stroke quantity of the input shaft 11 is changed at a change rate of the manipulation stroke quantity of the above-mentioned input shaft with respect to the output in the low deceleration (low G) region. Accordingly, to obtain the deceleration larger than the deceleration during the usual braking operation in the low deceleration (low G) region, it is possible to obtain the desired large deceleration with a pedal step-in quantity which is smaller than the step-in quantity of the brake pedal necessary for obtaining the large deceleration with the servo ratio SR1 during the usual braking operation in the low deceleration (low G) region. Accordingly, it is possible to more effectively obtain the favorable brake feeling with respect to the vehicle which requires the large braking force during the usual braking operation in the intermediate deceleration (intermediate G) region than during the usual braking operation in the low deceleration (low G) region of a vehicle which has the large vehicle weight.

Here, in the above-mentioned embodiment, the negative pressure booster 1 assumes the full load state immediately before the rear surface of the flange 27a of the vacuum valve seat member 27 is brought into contact with the front end 29c of the cylindrical portion of the cylindrical member 29. However, it is possible to allow the negative pressure booster 1 to assume the full load state at a point of time that the rear surface of the flange 27a of the vacuum valve seat member 27 is brought into contact with the front end 29c of the cylindrical portion of the cylindrical member 29. Alternatively, it is possible to allow the negative pressure booster 1 to assume the full load state after the rear surface of the flange 27a of the vacuum valve seat member 27 is brought into contact with the front end 29c of the cylindrical portion of the cylindrical member 29. In these cases, the maximum shortened stroke quantity of the input shaft 11 becomes L.

Further, in the above-mentioned embodiment, the operation control of the vacuum valve seat member 27 is performed based on the pressure difference between the pressure of the variable pressure chamber 9 and the pressure of the constant pressure chamber. However, the present invention is not limited to such an operation control and the operation control of the vacuum valve seat member 27 may be performed based on only the pressure of the variable pressure chamber 9 or the pressure difference between the variable pressure chamber 9 and another fixed pressure. Further, in place of the pressure of the variable pressure chamber 9, the operation of the vacuum valve seat member 27 may be controlled in response to a pressure corresponding to an input applied to the input shaft.

Further, in the above-mentioned embodiment, the present invention is applied to the single-type negative pressure booster which includes one power piston 5. However, the present invention is applicable to a tandem-type negative pressure booster which includes a plurality of power pistons 5.

Still further, although the negative pressure booster of the present invention is applied to the brake system in the previously-mentioned embodiment, the present invention is applicable to other system or device which uses the negative pressure booster.

INDUSTRIAL APPLICABILITY

The negative pressure booster of the present invention is preferably applicable to a booster in a boosting system such as a brake booster in a brake boosting system of an automobile.

The invention claimed is:

1. A negative pressure booster comprising;
a valve body which is reciprocally disposed inside a shell,
a power piston which is mounted in the valve body and partitions an interior of the shell into a constant pressure chamber into which negative pressure is introduced and a variable pressure chamber into which atmosphere is introduced at a time of operating the negative pressure booster,
a valve plunger which is connected to an input shaft and is slidably disposed inside the valve body,
a vacuum valve which controls communication or interruption between the constant pressure chamber and the variable pressure chamber,
an atmospheric valve which controls interruption or communication between the variable pressure chamber and at least atmosphere due to operation of the valve plunger, and
a stroke shortening mechanism which shortens a manipulation stroke quantity of the input shaft in an output region with an output larger than a given output, than the manipulation stroke quantity of the input shaft in the output region with the output larger than the given output when the manipulation stroke quantity of the input shaft is changed at a change rate of the manipulation stroke quantity of the input shaft with respect to the output in an output region with an output equal to or below the given output, wherein the stroke shortening mechanism is atmospheric valve opening quantity increasing means which is operated in the output region with the output larger than the given output and increases a valve opening quantity of the atmospheric valve larger than the valve opening quantity during a usual operation, and the operation of the atmospheric valve opening quantity increasing means is controlled in response to pressure of the variable pressure chamber corresponding to the input.

2. A negative pressure booster according to claim 1, wherein the vacuum valve includes a valve element and a vacuum valve seat on which the valve element is detachably seated and, the atmospheric valve includes the valve element and an atmospheric valve seat on which the valve element is detachably seated, and the atmospheric valve opening quantity increasing means includes a valve seat member which has the vacuum valve seat mounted on one end side thereof, and wherein the valve seat member is mounted in the valve body movably between a first position which is positioned in the output region with the output equal to or below the given output and a second position which is positioned in the output region with the output larger than the given output, and a movement of the valve seat member is controlled in response to the pressure of the variable pressure chamber.

3. A negative pressure booster according to claim 2, wherein the movement of the valve seat member is controlled in response to a pressure difference between the variable pressure chamber and the constant pressure chamber.

* * * * *